United States Patent [19]

Peczeli et al.

[11] 4,142,806

[45] Mar. 6, 1979

[54] FLUID SHEAR EMULSIFIER

[75] Inventors: Charles F. Peczeli, Mississauga; Anthony J. Last, Oakville, both of Canada

[73] Assignee: Ontario Research Foundation, Mississauga, Canada

[21] Appl. No.: 703,259

[22] Filed: Jul. 7, 1976

[30] Foreign Application Priority Data

Jul. 9, 1975 [GB] United Kingdom ............... 28938/75

[51] Int. Cl.² ............................. B01F 3/12; B01F 5/04
[52] U.S. Cl. ................................................. 366/341
[58] Field of Search ........................... 259/4 R, 18, 36; 366/341

[56] References Cited

U.S. PATENT DOCUMENTS

| 2,043,108 | 6/1963 | Maurer | 259/4 R X |
| 2,653,801 | 9/1953 | Fontein et al. | 259/4 R |
| 3,298,669 | 1/1967 | Zingg | 259/4 R |
| 3,994,480 | 11/1976 | Fothergill et al. | 259/4 R |

Primary Examiner—Billy S. Taylor
Attorney, Agent, or Firm—Sim & McBurney

[57] ABSTRACT

This invention provides a fluid shear device for emulsifying or mixing liquids, and also useful for deaeration. A central chamber with a tangential inlet has a forward wall perpendicular to the chamber axis and a rearward wall with a reverse curve in profile such that the rearward wall is more parallel to the forward wall in its outer portion than its inner portion. This produces a number of advantages in terms of pressure energy released, which energy is then available for the shearing and mixing function.

12 Claims, 7 Drawing Figures

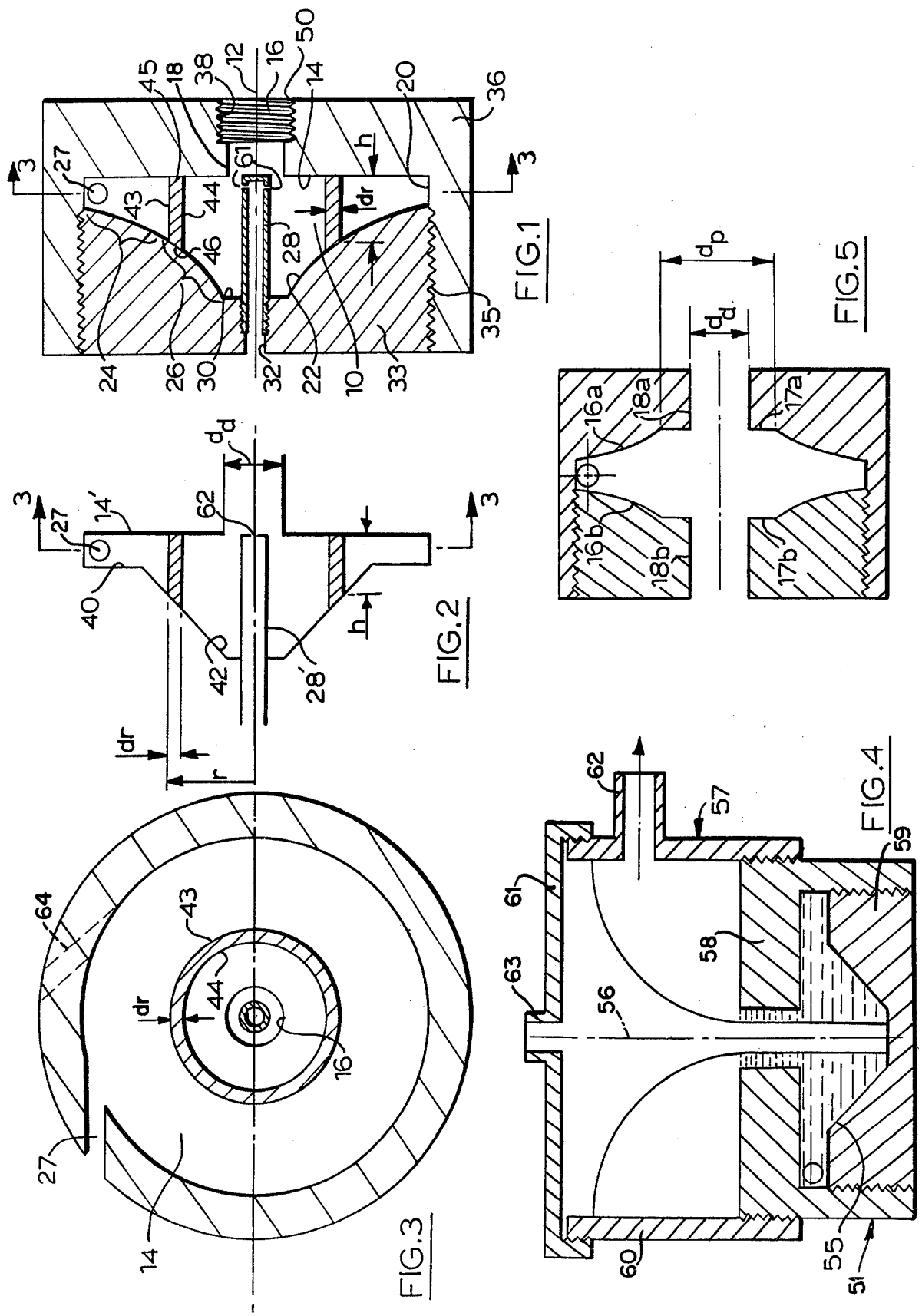

FLUID SHEAR EMULSIFIER

This invention relates generally to a device adapted either to separate lighter constituents from a liquid or to produce a distribution of gases, liquids or solid powders in a liquid in such a manner that the distribution is uniform and the particles of the distributed material are small.

More particularly, this invention relates to a fluid shear device which includes a radially symmetrical shear chamber in which liquid can rotate while spiralling inwardly toward the axis, in order to give rise to the following phenomena which can be used in various combinations to accomplish the desired results:

(a) the shear between adjacent and concentric liquid layers moving at different velocities;

(b) the differences in radial forces acting upon media of different densities and rotating around the same axis at the same velocity;

(c) the centre core, filled with the gases separated from the liquid and by the vapours of the liquid, which exists on account of high speed rotation;

(d) the substantial and high frequency pressure fluctuations which exist in and around said centre core.

It is an aspect of this invention to provide a configuration for a fluid shear device capable of efficiently and usefully giving rise to the phenomena listed above.

Accordingly, this invention provides a fluid shear device comprising a shear chamber having a central axis, the chamber being substantially radially symmetrical and including a forward wall having at least an inner portion perpendicular to said axis, a central axial cylindrical outlet passageway through said inner portion of the forward wall and defining a substantially sharp corner therewith, a peripheral wall adjoining said forward wall, a rearward wall having a first portion extending inwardly from said peripheral wall and forming at most a small acute angle with said inner portion of the forward wall, and a second portion of said rearward wall extending rearwardly and inwardly from the first portion and defining a greater angle with said inner portion of the forward wall, whereby the axial dimension of said shear chamber increases with diminishing radius at a greater rate in said second then in said first portion of the rearward wall; an inlet opening tangentially through the peripheral wall, the forward wall and the said first portion of the rearward wall being closely juxtaposed about opposite sides of said inlet.

Three embodiments of the fluid shear device of this invention are illustrated in the accompanying drawings, in which like numerals denote like parts throughout the several views, and in which:

FIG. 1 is an axial sectional view through the first embodiment of this invention;

FIG. 2 is an axial sectional view of the second embodiment of this invention;

FIG. 3 is a sectional view taken along the line 3—3 in either FIG. 1 or FIG. 2;

FIG. 4 is an illustration of one use for the second embodiment of this invention;

FIG. 5 is an axial sectional view through the third embodiment of this invention.

Figure 6:
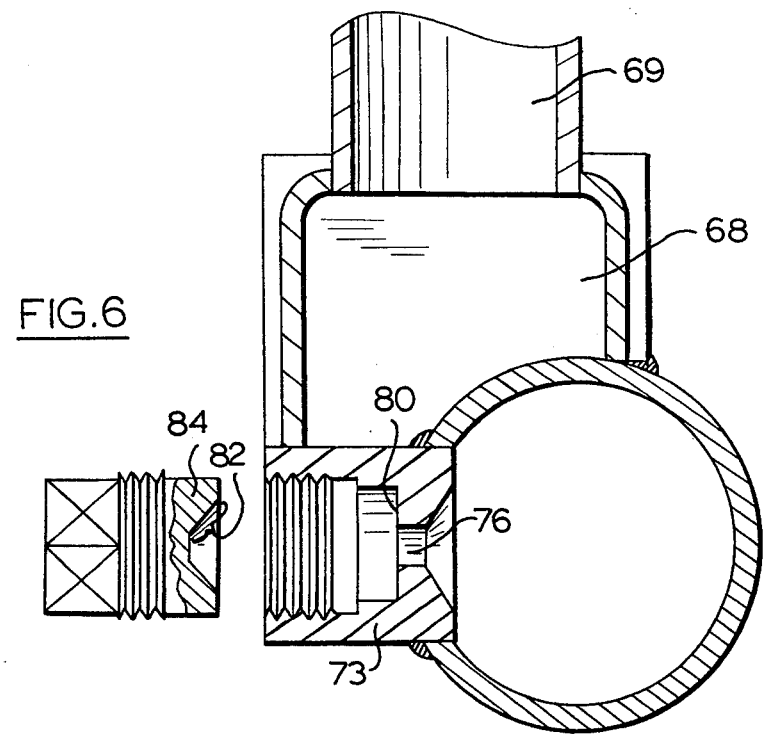
FIGS. 6 and 7 are sectional views showing one operational context for use with the second embodiment of this invention in connection with emulsification.

FIG. 1 represents one preferred shape of the device of this invention, being an axial sectional view. The sectional configuration shown in FIG. 2, the second embodiment, represents a good approximation of the ideal shape, and has the advantage of easier production in terms of machining. FIG. 3 illustrates a sectional view which may be considered valid for both the embodiments of FIGS. 1 and 2.

The preferred configuration shown in FIG. 1 has the following characteristics. A central shear chamber 10 is provided, which is generally radially symmetrical about its axis 12. The chamber 10 is defined by a forward wall 14 which is perpendicular to the axis 12, a central axial cylindrical outlet passageway 16 through the forward wall 14 and defining a substantially sharp corner 18 therewith, a peripheral wall 20 adjoining the forward wall 14 at its outer limit, and a rearward wall 22. In the first embodiment shown in FIG. 1, the rearward wall 22 consists of a smooth curve in profile, which may be divided arbitrarily into a first or outer portion 24 which forms a relatively small angle with the forward wall 14, and a second portion 26 which continues on from the first portion but extends more rearwardly than the first portion and defines a greater angle with the forward wall 14. Thus, the axial dimension of the shear chamber 10 is seen to increase with diminishing radius at a greater rate in the second portion than it does in the first portion of the rearward wall 22.

An inlet 27 opens tangentially through the peripheral wall, and as can be seen in FIG. 1 the forward wall 14 and the first portion 24 of the rearward wall 22 are closely juxtaposed about opposite sides of the inlet 27.

The embodiments of FIGS. 1 and 2 also show the presence of an axial tube extending through the centre of the rearward wall 22. As can be seen in the figures, the tube 28 is smaller in diameter than the outlet passageway 16. Immediately around the tube 28, the rearward wall 22 has a flat, normal portion 30.

The axial tube 28 is useful for certain functions of the fluid shear device of this invention, but may be omitted for other functions. As can be seen best in FIG. 1, the tube 28 is threaded at its rearward end, and is adapted to be received into mating threads in a bore 32 machined in a first piece 33 which essentially defines the rearward wall 22 of the chamber 10. The piece 33 also has threads 35 at its outer wall, and is adapted to be screwed into a machined recess in a further piece 36 which essentially defines the peripheral wall 20, the forward wall 14, and the outlet passageway 16. The outlet passageway 16 may also be threaded as at 38 for receiving the mating ends of other apparatus, tubes, hose connections, etc.

It will thus be seen that FIG. 1 represents a complete structure with all portions illustrated, whereas FIG. 2 is more schematic. It will be understood, however, that the embodiment of FIG. 2 could be put together in the same manner as shown in greater detail for the embodiment of FIG. 1.

Turning briefly to FIG. 2, it can be seen that the part of the rearward wall corresponding to the first portion 24 has been made in fact parallel with the forward wall 14' and thus is in the shape of an annulus 40 aligned with the forward wall 14'. The part of the rearward wall in FIG. 2 which corresponds to the second portion 26 of the same wall in FIG. 1 is a simple cone 42 which extends inwardly and rearwardly from the inner periphery of the annular first portion 40.

It will be seen from the technical discussion which follows that the advantages inherent in the curved profile shown in FIG. 1 are also substantially obtained by the profile of FIG. 2, and it will be evident that the profile shown in FIG. 2 lends itself more easily to manufacturing techniques.

The idealized configuration of the rearward wall 22 in FIG. 1 is an exponential curve, although this is not considered essential for obtaining the important advantages of this invention. Utilizing this idealized curve, however, the surface 22 is almost parallel with the forward wall 14 at its intersection with the peripheral wall 20, and the curvature of the rearward wall 22 gradually increases toward the axis 12 of the device. Hence the width h of the chamber 10 taken parallel with the axis enlarges at an ever increasing rate from the periphery towards the axis 12. The provision of the plane surface 30 intersecting the curved surface 22 in FIG. 1 has to do with practical considerations. The curve of the wall 22 could be continued rearwardly if desired, but would not significantly increase the advantages inherent in the device.

The principle by which this device operates will now be described. Liquid is considered to be delivered at a given rate and pressure, and normally at a low velocity, to one or more tangential inlets such as the inlet 27. The cross sectional area of the inlet 27 is designed to accelerate the liquid up to a desired velocity. As the liquid enters the chamber 10 from the confines of the tangential inlet 27, it loses part of its energy to an irregular turbulence, which is proportional to the second power of its velocity. It also follows that the "desired velocity" in the tangential inlet has an upper limit for economic reasons.

In the chamber 10, the liquid continues to move along and against the peripheral wall 20. The wall friction here is directly proportional to the surface area of the peripheral wall 20 and to a "power" of the liquid velocity. This "power" ranges from the third power of the velocity in the case of high Reynolds numbers (high velocity and low viscosity) to the second power of the velocity in the case of low Reynolds numbers (low velocity and high viscosity). The latter constitutes a further reason to keep the velocity in the tangential inlet 27 to a moderate level. It further indicates that it is highly desirable to keep the width of the peripheral wall 20 taken parallel with the axis 12 as small as possible.

The liquid is forced inwardly from the peripheral wall 20. Since the compressibility of the liquid is negligible, for a flowrate of V on any radius r and width h (FIGS. 1 and 2) the radial velocity is $v_r = V/2r \pi h$. It then follows that, in a chamber bounded by parallel planes, the radial velocity is inversely proportional to the radius.

In devices within the scope of this invention, the width h of the chamber 10 increases toward the centre, and hence the increase of the radial velocity is proportionately less. The advantages of this arrangement will be made apparent subsequently.

The radial velocity reaches its maximum value at or around $d_d$, in FIGS. 1 and 2. In the device provided by this invention, the ratio of tangential to axial velocity components at this diameter is larger than 5:1 and the corresponding ratio of kinetic energies is larger than 25:1. For this reason, in the following explanation the radial component is neglected, and the expression "tangential component of the liquid velocity" is shortened to "velocity".

dF/dr denotes the effect of friction between the side walls (14 and 22 in FIG. 1; 14' and 40, 42 in FIG. 2) and the moving liquid. It is the same function of the surface area and the velocity as that discussed previously in connection with the Reynolds number.

The areas for an elementary annulus of dr thickness on a radius r are shown in FIGS. 1-3. Observing the area bounded by 43 and 44 in FIG. 3, it becomes obvious that this is directly proportional to the radius. It thus follows that the effect of wall friction is diminishing towards the centre.

Turning to FIG. 1, it will be seen that the surface area 45 is smaller than the surface area 46, due to the slope of the latter. It follows that a chamber bounded with parallel walls would have smaller wall friction than the chamber shown in FIG. 1. The reason for departing from what might seem to be an obvious course, namely to keep both the forward and rearward walls aligned and parallel with each other on the periphery all the way to the centre, is as follows. The advantages of providing a narrow width adjacent the peripheral wall 20 have already been stated. However, it is a clear advantage for the chamber 10 to have a substantial width on its smaller radii, and this will be demonstrated subsequently. It is for this reason that the width of the chamber measured parallel to the axis 12 increases towards the centre.

The most efficient shape for this increase in width is an exponential curve. On the large radii, or outer part of the chamber 10, where surface ares 45 and 46 are large on account of the large radii, the difference in surface length between surfaces 45 and 46 is minimal. Thus the increase in wall friction is not significant. However on the small radii, or inner part of the chamber, this difference increases due to the increasing slope, but the effect of wall friction is diminishing. Hence the behaviour of the liquid is not affected to a large extent.

In the vicinities of the tangential inlet 27 and the discharge passageway 16, there are two zones of high tubulence due to the changing cross sections and directions. Between these two zones the conditions are more regular, and the behaviour of the liquid is governed by the following equation:

$$\frac{dp}{dr} - \frac{dF}{dr} - \frac{dS}{dr} + \frac{dKE}{dr} = 0$$

Of these dp/dr is the pressure gradient. The rotating mass of liquid, shown in FIG. 1 by the boundaries 43, 44, 45 and 46, will always exert a higher pressure on boundary 43 than on boundary 44, hence there is always a pressure drop towards the centre. The numerical value of this gradient is $$\frac{dp}{dr} = \frac{v^2}{r},$$

where ρ is the density, v is the velocity and r is the radius.

It follows that the pressure energy released is directly proportional to the second power of the velocity and inversely proportional to the radius. The creation of such a high pressure gradient is one of the objectives of this invention.

When adjacent and concentric layers, such as 43 and 44, move at different velocities, shear stresses are created between them. Creation of such shear stresses is another objective of this invention.

The shear work, dS/dr, is a complex function of radius r, width h, velocity v, the first derivative of the velocity dv/dr (i.e. the acceleration) and the second derivative of the velocity.

In practical terms it can be stated that significant shear work can be obtained only on small radii, and only if both the velocity and the acceleration of the liquid are high. In this case the shear work is directly proportional to width h.

The balance of the three energy terms discussed determines the fourth, dKE/dr. If the pressure energy released is higher than the friction loss and the shear work, then the difference is absorbed and converted into kinetic energy by the liquid. In other words, the liquid accelerates. Conversely, if the released pressure energy is not sufficient, the liquid decelerates.

Numerically, dKE/dr is proportional to the velocity and to the acceleration.

Considering all four terms together, it becomes obvious that on the large radii the effect of the wall friction limits the velocities. Limited velocities and large radii restrict the pressure gradient, thus only a limited amount of pressure energy can be released. For this reason the accelerations are low and hence the shear work is negligible.

The purpose of the outer region of the chamber in a well designed device in accordance with this invention is as follows:
(a) to provide a space where the turbulence created by the tangential inlet is economically damped out;
(b) to ensure that the liquid enters the inner annulus at high velocities. As has been discussed above, the high velocities could not be obtained economically by the tangential inlet alone on account of turbulence and friction on the periphery.

On the small radii the effect of the wall friction diminishes. The liquid accelerates to higher velocities which, in turn, greatly increases the release of the pressure energy. In a well designed device, for example, dp/dr can increase from 1 psi/inch at the periphery to several thousand psi per inch in the vicinity of the discharge nozzle diameter $d_d$. A very large part of the energy thus released is available to accelerate the liquid to even higher velocities. High velocities and high acceleration create a significant shear in this inner annulus.

It can be seen that the two objectives of the device stated previously, the high pressure gradient and the shear, are obtained in this inner annulus. Further, both the pressure gradient and the shear can reach their maximum values if the diameter $d_d$ of the discharge passageway 16 is kept to a minimum. The limit between the inner and outer radius is not sharp, as the conditions change gradually. For this reason, a sharp distinction can not be formalized.

On diameters smaller than $d_d$ the liquid starts to move in the axial direction to enter the discharge passageway 16.

A third objective of this invention is to provide a central core, extending essentially from the plane of the rearward wall 30, to and beyond the downstream end 50 of the discharge passageway 16. This central core can be filled with gases separated from the liquid or by liquid vapour, depending upon the nature of the material being utilized.

The prerequisites for a central core of desirable size and stability are as follows:
(a) Diameter $d_d$ must be in proper relationship to the flowrate.
(b) The tangential velocity component must be sufficiently high at $d_d$.
(c) The ratio of tangential to axial velocity components must satisfy the ratio given as 5:1 previously in this disclosure.
(d) The shape must conform to the requirements relating to the shape of the forward wall 14, the sharp corner 18, and the presence of the outlet passageway 16.

The pressure inside this core can be adjusted within wide limits through the proper selection of various design parameters.

If it is so desired, the pressure might approach that of absolute vacuum. On the other hand, if the device is connected to a pressurized container, the central pressure might be nearly as high as the pressure in the container and thus higher than the atmospheric pressure.

In the vicinity of the discharge nozzle diameter $d_d$ and extending from the forward wall 14 to and beyond the downstream end 50 of the discharge passageway 16, the conditions are highly unstable. Substantial and high frequency pressure fluctuations are manifested by the presence of a strong audible tone. The pitch of this tone corresponds to the rate of revolutions in the discharge passageway 16 (tangential velocity component divided by periphery) and it might reach several thousand cycles per second.

There are two regions where this instability reaches maximum values:
(a) At the entry from the chamber 10 into the discharge passageway 16. In this region the pressure in the central core reaches its minimum value.
(b) At the downstream end 50 of the discharge passageway 16.

The creation of this zone with substantial and high frequency pressure fluctuations is the fourth objective of this invention.

One utilization of the device in accordance with this invention is to separate lighter constituents from a heavier liquid, and more specifically to separate out a a gaseous constituent. In the following discussion, this is referred to simply as "gases".

Within the device in operation, the gas bubbles in the liquid rotate in the same annular layers and at the same tangential velocities as the liquid matrix. A radial force, proportional to the pressure gradient and to the differences in the densities, accelerates and moves the gases towards the centre at a faster rate than the liquid. In this motion, the friction between the gas bubbles and the liquid is overcome.

As concentric layers rotate at different tangential velocities, gas bubbles in different annular layers contact each other and join together. This process reduces the surface to mass ratio, and hence reduces the effect of friction. This effect is optimized if the shear stresses are kept at a moderate level.

Most of the separation takes place in the inner annulus of chamber 10, because
(a) the pressure gradient is high,
(b) the pressure itself is low, hence the gas expands, and thus the difference in densities increases.

The quantity of the gas that separates while the liquid is put through the device once (in "one pass") depends on the time that the liquid spends in the device, particularly in the inner annulus of the device. The residence time in any part of the device can be calculated by dividing the volume of the specified part by the flow rate.

It follows that the shapes shown in FIGS. 1 and 2, which increase the volume of the inner annulus through increased width, are superior de-aerators.

A significant part of the gas originally in the liquid thus separates and collects in the centre core, where it is "stored" until removal. A relatively long centre core, assured by the shapes shown in FIGS. 1 and 2, provides a large surface area for efficient collection and storage volume to compensate for the fluctuations in the rate of separation.

One method to remove the gases collected in the core is illustrated in FIG. 4, to which attention is now directed. A device 51 defining an internal chamber 55 shaped as illustrated in FIG. 2 is threaded into connection coaxially within a round container 57, with their common central axis of symmetry 56 being vertical. The device 51 includes a first part 58 defining the forward wall (uppermost in FIG. 4), in threaded connection with a second part 59 defining the rearward wall (lowermost in FIG. 4). The container 57 includes a cylindrical side wall 60 in threaded connection with a cap member 61. An outlet 62 for liquid is provided in the side wall 60, while an outlet 63 for gas is provided centrally of the cap member 61. The rotation of the liquid discharged from the device 51 induces a similar rotation in the container 57. This relation creates a low pressure area along the common axis, through which the separated gases may rise.

When the device of this invention is to be utilized for emulsification of two or more liquids, at least one of the liquids is supplied tangentially to the chamber. In the discussion which follows, the first or carrier liquid will be referred to as the "matrix". The purpose of the use to be described is to add another "liquid", which might in effect be liquid, gaseous or solid powder, to the matrix and thus to form an emulsion, dispersion or mixture.

The device is designed, in accordance with the principles already discussed, in order to create a central core with a substantial vacuum.

The central core is placed into communication with the other "liquid" which is intended to be mixed with the matrix. A preferred arrangement utilizes the central tube 28 or 28', with its downstream end located in a zone of minimum pressure, which is close to the plane of the forward wall 14.

The other "liquid" will be drawn into the centre core by the high vacuum existing there. By being subjected to substantial and high frequency pressure fluctuations existing in this region, the other liquid will break down into small fragments to be entrained in the matrix.

The ratio of the other "liquid" that can be added to the matrix in a single pass is limited by the size of the centre core and by the vacuum existing in the core. Also, it might be necessary to refine the distribution and the particle size of the other "liquid".

Thus, provided the other "liquid" is a proper liquid or a solid powder, it might be desirable to feed the discharge from the device into a pump to raise its pressure to the original level, and then deliver it again to the tangential inlet of the same device or of another similar device.

The number of passes which might be applied is limited by economic factors alone.

In the second and subsequent passes the shear generated in the inner annulus of the device is fully utilized. It shears the particles of the other "liquid", and thus produces finer particles and a more uniform distribution.

The device of this invention containing only a single tangential inlet may also be utilized to emulsify or mix together a matrix with a liquid. In order to accomplish this, a single combined liquid containing the various constituents (though roughly mixed) is fed into the tangential inlet 27 (FIG. 1) in the manner already described. Under the influence of the shear and the substantial and high frequency pressure fluctuations, the distribution of the constituents becomes more uniform and the particle size is reduced. This applies even if some of the constituents are aggregates or agglomerates of solid particles.

A further mode of operation for emulsification is to utilize a device with two or more tangential inlets of equal or unequal size. Each of the liquids to be emulsified together is delivered into a separate inlet under the pressure required by the pre-determined volumetric ratio in the end product. Under the influence of the shear and the substantial and high frequency pressure fluctuations the various liquids are mixed, dispersed or emulsified, as the case may be. The position of a second tangential inlet 64 is shown in broken lines in FIG. 3.

Thus far it has been pointed out that the values of the shear and of the pressure gradient increase very sharply with the reduction of the diameter.

On the other hand, the diameter of the discharge passageway 16 (FIG. 1) is limited by the requirement that the liquid must pass through it without excessive pressure losses. Furthermore, the centre of said passageway 16 must be reserved for the centre core.

If the central section is not used for feed or de-aeration, as in the cases already described, two discharge passageways can be used.

An appropriate design is shown schematically in FIG. 6. A chamber 10b is bounded on opposite sides by curved surfaces 16a and 16b. Alternatively, the exponential curves defining these surfaces can be approximated by planes and conical surfaces.

At the inner annulus, curved surfaces 16a and 16b are intersected by planes 17a and 17b. These planes are parallel and at substantially right angles to the discharge passageways 18a and 18b. The intersection between the planes and the discharge passageways is essentially sharp.

It is an important requirement that the diameter $d_p$ defined by the intersections of the curved surfaces 16a, 16b and planes 17a and 17b, be at least twice as large as diameters $d_d$ of discharge passageways 18a and 18b.

For reasons already stated, it may not be advisable to make the individual fluid shear devices large enough to suit a required flow rate, if the latter is particularly great.

Figure 7:
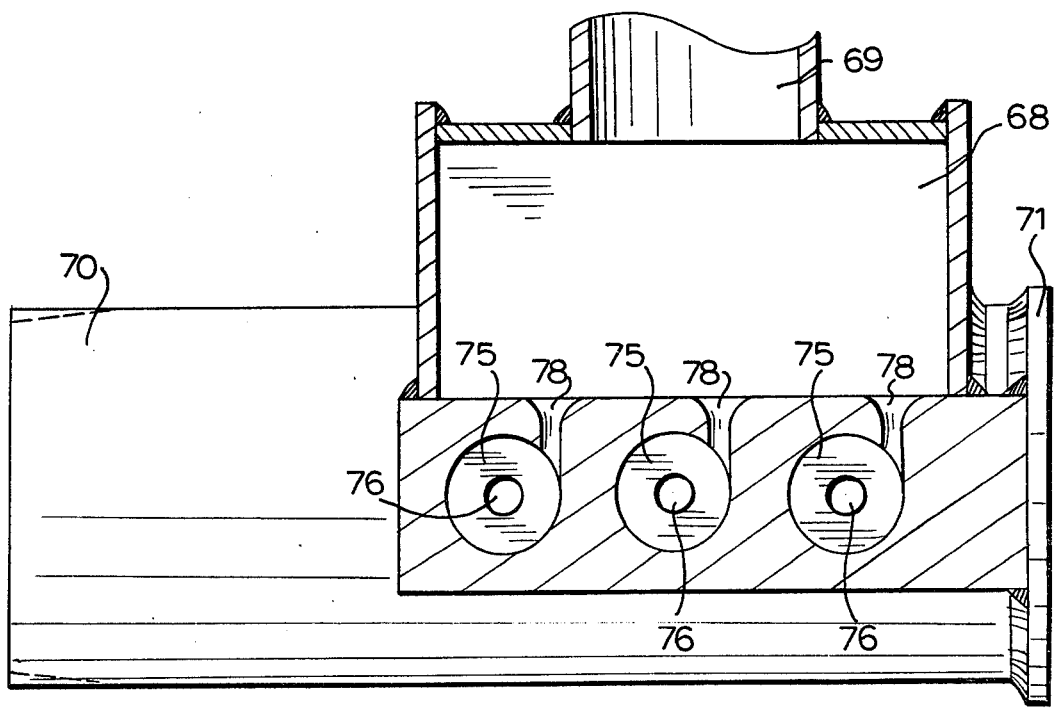

FIGS. 7 and 8 show the provision of a number of devices ganged in parallel in a single unit. Since the devices are operating in parallel, the capacity of the ganged unit increases in direct proportion to the number of devices.

In FIGS. 7 and 8 an inlet manifold 68 is provided, with an inlet pipe 69 connected thereto. The manifold 68 has roughly a rectangular configuration, and is welded, soldered or otherwise attached against the outer surface of a pipe 70' which is capped at 71. The pipe 70 constitutes the outlet manifold for the unit shown in the figures. Also forming part of the assembly is a metallic block 73 in which three devices constructed in accordance with this invention are illustrated. The devices are designated by the numeral 75, and each includes an outlet passageway 76, a tangential inlet 78, and a chamber in the shape of that shown in FIG. 2. The chamber is defined between a forward wall 80' and a rearward wall 82, which is machined into a plug 84 adapted to be threaded into the block 73.

We claim:

1. A fluid shear device comprising a shear chamber having a central axis, the chamber being substantially radially symmetrical and including a forward wall having at least an inner portion perpendicular to said axis, a central axial cylindrical outlet passageway through said inner portion of the forward wall and defining a substantially sharp corner therewith, a peripheral wall adjoining said forward wall, a rearward wall having a first portion extending inwardly from said peripheral wall and forming at most a small acute angle with said inner portion of the forward wall, and a second portion of said rearward wall extending rearwardly and inwardly from the first portion and defining a greater angle with said inner portion of the forward wall, whereby the axial dimension of said shear chamber increases with diminishing radius at a greater rate in said second then in said first portion of the rearward wall; an inlet opening tangentially through the peripheral wall, the forward wall and the said first portion of the rearward wall being closely juxtaposed about opposite sides of said inlet.

2. The invention claimed in claim 1, in which the first portion of the rearward wall is parallel with said inner portion of the forward wall, and in which the second portion thereof is conical.

3. The invention claimed in claim 1, in which the first and second portions of the rearward wall merge smoothly into each other and define a single curved profile as seen in axial section, the curve being convex toward the forward wall.

4. The invention claimed in claim 3, in which the curved profile is an exponential curve.

5. The invention claimed in claim 2, which further includes an axial tube through the center of the rearward wall, the tube extending to the region of the plane of the forward wall and being smaller in diameter than the outlet passageway.

6. The invention claimed in claim 4, which further includes an axial tube through the center of the rearward wall, the tube extending to the region of the plane of the forward wall and being smaller in diameter than the outlet passageway.

7. The invention claimed in claim 2, in which there are at least two inlets opening tangentially through the peripheral wall.

8. The invention claimed in claim 4, in which there are at least two inlets opening tangentially through the peripheral wall.

9. The invention claimed in claim 1, in which all portions of the forward wall are coplanar.

10. The invention claimed in claim 1, in which the forward wall also includes an outer portion which extends between the peripheral wall and the outer perimeter of the inner portion of the forward wall, the outer portion having an outer part forming at most a small acute angle with respect to the inner portion of the forward wall, and having an inner part defining a greater angle with said inner portion of the forward wall, the rearward wall including a third portion thereof within the second portion, the third portion being flat and perpendicular to the axis; the device also including a further cylindrical outlet passageway through said third portion extending in the opposite direction from said first-mentioned outlet passageway.

11. A method of emulsifying two liquids, comprising the steps of:

injecting the two liquids into at least one tangential inlet of a fluid shear device which defines a radially symmetrical shear chamber having a planar forward wall normal to the chamber axis, a central axial cylindrical outlet passageway through said forward wall and defining a substantially sharp corner therewith, a peripheral wall adjoining said forward wall, and a rearward wall having a first portion extending inwardly from said peripheral wall and forming at most a small acute angle with said forward wall, and a second portion of said rearward wall extending rearwardly and inwardly from the first portion and defining a greater angle with said forward wall, whereby the axial dimension of said shear chamber increases with diminishing radius at a greater rate in said second than in said first portion of the rearward wall; the forward wall and said first portion of the rearward wall being closely juxtaposed about opposite sides of said inlet;

passing the two liquids rotatingly inwardly along a spiral path to approach the central axis, while increasing the tangential component of the speed thereof, and at the region of the outlet passageway adding an axial component to the motion of the liquids to pass them outwardly and therealong while undergoing helical movement, whereby the high radial gradient of tangential speed in the shear chamber in the region of the outlet can emulsify the two liquids.

12. The method claimed in claim 11, in which the two liquids are injected into the fluid shear device through two separate tangential inlets.

* * * * *

UNITED STATES PATENT AND TRADEMARK OFFICE
CERTIFICATE OF CORRECTION

PATENT NO. : 4,142,806
DATED : March 6, 1979
INVENTOR(S) : Charles F. Peczeli, et al It is certified that error appears in the above—identified patent and that said Letters Patent are hereby corrected as shown below:

Column 4, the formula after line 51 should read $$\frac{dp}{dr} = \rho \frac{v^2}{r}$$

*Signed and Sealed this*

*Twenty-seventh* Day of *November 1979*

[SEAL]

Attest:

RUTH C. MASON
*Attesting Officer*

LUTRELLE F. PARKER
*Acting Commissioner of Patents and Trademarks*